March 14, 1967 C. R. WILHELMSEN 3,309,692
CHARACTER DISPLAY APPARATUS
Filed Dec. 3, 1964 10 Sheets-Sheet 1

United States Patent Office 3,309,692
Patented Mar. 14, 1967

3,309,692
CHARACTER DISPLAY APPARATUS
Carl R. Wilhelmsen, Huntington Station, N.Y., assignor to Hazeltine Research, Inc., a corporation of Illinois
Filed Dec. 3, 1964, Ser. No. 415,766
15 Claims. (Cl. 340—324)

This invention relates to character display apparatus. Such apparatus is capable of receiving an electrical signal representative of some character and providing a visual indication of that character as it would normally be written or read. The invention is particularly directed to a character display which employs a cathode-ray beam display device.

Generally, the character display employing a cathode-ray beam display device (e.g. a cathode-ray tube) operates by causing the cathode-ray beam to scan a composite pattern on the face of the cathode-ray tube and by selecting specific segments from that pattern to compose the particular character to be displayed. This is accomplished through the use of matrix circuits which respond to the electrical signal input information to develop beam deflection control signals and beam intensity control signals. These control signals are in time synchronism so that a variety of characters may be displayed on the cathode-ray tube by specifically selecting those times at which the cathode-ray beam is to be intensified, at which times the cathode-ray beam is scanning specific segments of the composite pattern.

Probably the most common pattern scanned on the face of the cathode-ray tube is a straight line figure-eight pattern. By appropriately selecting certain of the vertical and horizontal segments which go to make up the pattern, all the numbers 0-9 and a number of letters of the alphabet may be composed. There are, however, a number of shortcomings associated with the straight line figure-eight pattern. First, not all of the letters of the alphabet can be composed from such a pattern. Second, many of those letters which can be composed cannot be composed with their natural outlines due to the absence of curved sections in the pattern. This latter shortcoming equally applies to the generation of certain numbers.

Objects of the present invention, therefore, are to provide new and improved character display apparatus capable of displaying all numbers and all letters of the alphabet and with their natural outlines.

In accordance with the present invention there is included in a character generator for displaying characters on an image reproducing device by selecting segments of a composite pattern composed of straight and curved segments, signal generating apparatus including a first means for supplying groups of signals, each group representative of a particular character to be displayed and a second means for generating a plurality of timing control signals. The apparatus also includes a third means coupled to the second means and responsive to the timing control signals, for generating deflection signals in a predetermined sequence, the deflection signals corresponding to straight and curved segments of the composite pattern. The apparatus additionally includes a fourth means, coupled to the first, second and third means and responsive to the character representative, timing control and deflection signals, for selecting a fixed number of deflection signals, the fixed number including a lesser number corresponding to the segments needed to form a particular character, and for supplying the selected deflection signals as output signals suitable for use by the image reproducing device, and for generating a fixed number of control signals, each corresponding to a given one of the selected deflection signals and indicative of whether or not the segment represented by the corresponding selected deflection signal is to be displayed, and for supplying these control signals as output signals suitable for causing the device to display a particular character.

For a better understanding of the present invention together with other and further objects thereof, reference is had to the following description taken in connection with the accompanying drawings, and its scope will be pointed out in the appended claims.

Referring to the drawings.

Description and operation of the character display apparatus

Figure 1:
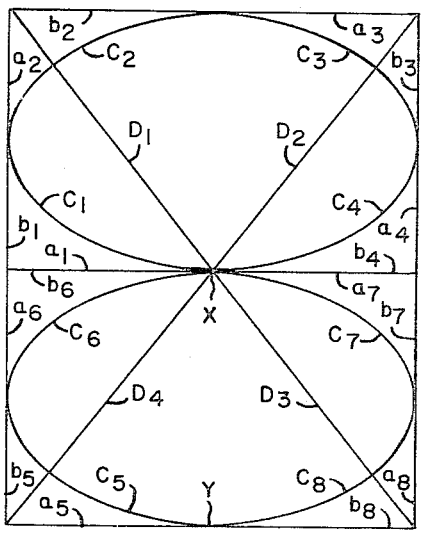
FIG. 1 shows a segmented straight line figure-eight —curved line figure-eight pattern.

The character display apparatus constructed in accordance with the present invention operates by developing each character from a segmented pattern. Referring to FIG. 1, there is shown a typical segmented pattern which may be used to accomplish the purposes of the invention. This segmented pattern includes a straight line pattern and a curved line pattern, each of which is essentially figure-eight shaped. The straight line pattern is composed of the diagonal segments $D_1$–$D_4$ and a plurality of discrete straight line corner segments $a_1$, $b_1$–$a_8$, $b_8$. The curved line pattern is composed of the curved corner segments $C_1$–$C_8$. Each straight line corner segment has associated with it a curved corner segment— the straight line corner segment $a_1$, $b_1$ has associated with it the curved corner segment $C_1$, the straight line corner segment $a_2$, $b_2$ has associated with it the curved corner segment $C_2$, etc. At least one end of each curved corner segment, furthermore, is in the same position as the corresponding end of its associated straight line corner segment. (This simply means that the start and end points of each curved corner segment are in the same position in the segmented pattern as are the start and/or end points of its associated straight line corner segment.) Thus, as will be subsequently made clear, it is possible to shift the scanning from a straight line corner segment to a curved line corner segment, e.g. from $a_1$, $b_1$ to $C_2$, without introducing any discontinuities or transients into the scanning process. All the numbers 0–9, all the letters of the alphabet A–Z, and a number of symbols may be developed by appropriate selection of certain segments of the over-all pattern and by rejection of all other segments.

Figure 2:
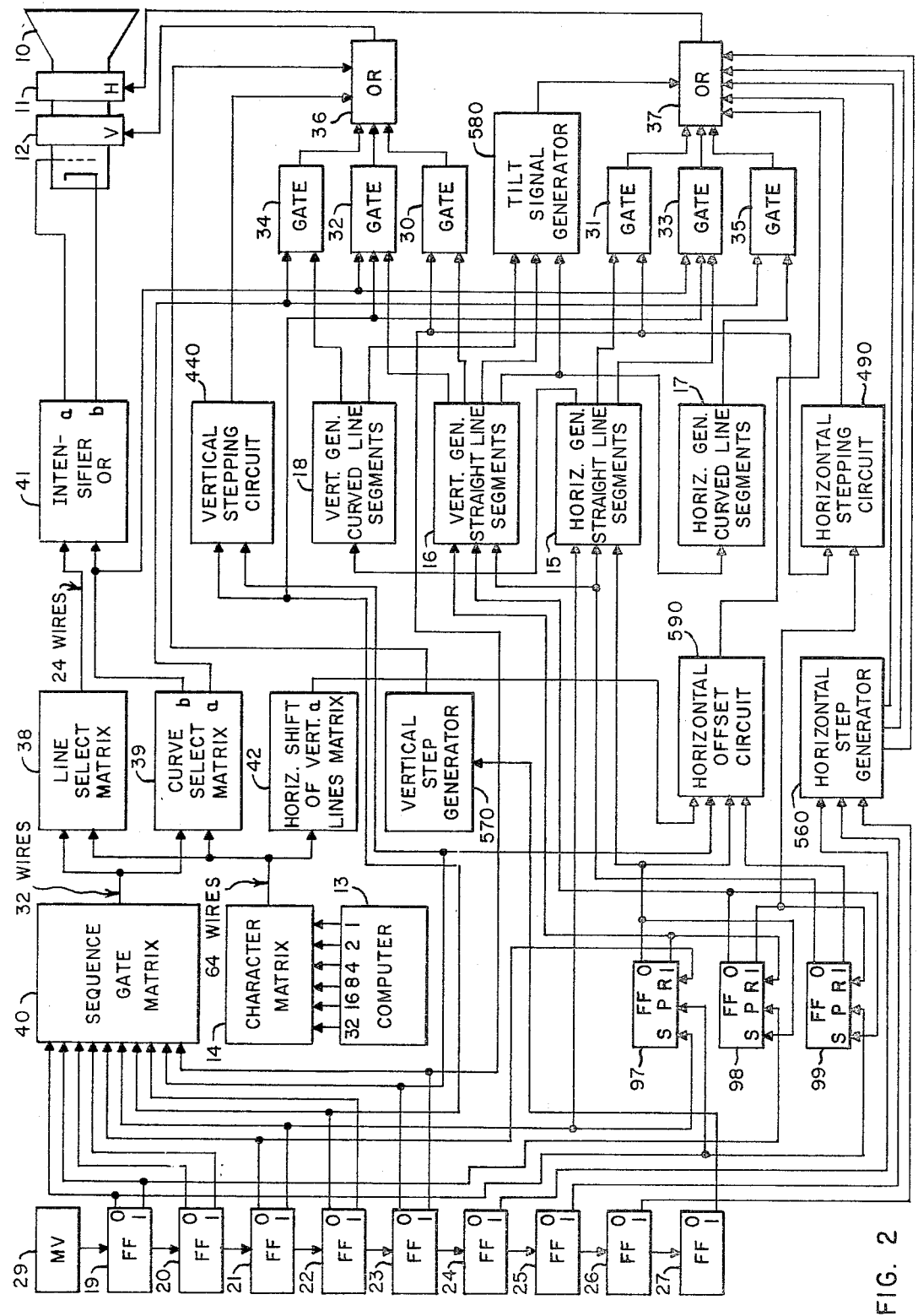
FIG. 2 is a block diagram of one form of character display apparatus constructed in accordance with the present invention.

FIG. 2 is a block diagram of one form of character display apparatus constructed in accordance with the present invention. This apparatus includes a cathode-ray tube 10 having a pair of deflection coils 11 and 12. Deflection coil 11 may, when properly energized, deflect the cathode-ray beam within cathode-ray tube 10 in the horizontal direction. Deflection coil 12 may, when properly energized, deflect the cathode-ray beam in the vertical direction. The cathode-ray tube 10 is used to display the desired character (number, letter, or symbol).

The character display apparatus also includes means for supplying signals representative of the characters to be displayed. This means includes a computer 13 or other such similar device which supplies character representative signals in binary or otherwise coded form. In particular, computer 13 supplies a six-bit binary coded signal which defines any of the numbers 0–9, any of the letters A–Z, and any of a number of predetermined symbols. This signal is developed at the output lines of computer 13 designated as 32, 16, 8, 4, 2 and 1.

This means also includes a character matrix 14 which converts the six-bit binary signal supplied by computer 13 to an indication of the particular character to be displayed. This indication is used in developing the deflection signals applied to the horizontal and vertical deflection coils 11 and 12 and in intensifying portions of the segmented pattern. This will be more fully described hereinafter. The character matrix 14 consists of three parts—a first part for producing an indication of the particular number to be displayed, a second part for producing an indication of the particular letter to be displayed, and a third part for producing an indication of the particular symbol to be displayed.

Figure 3:
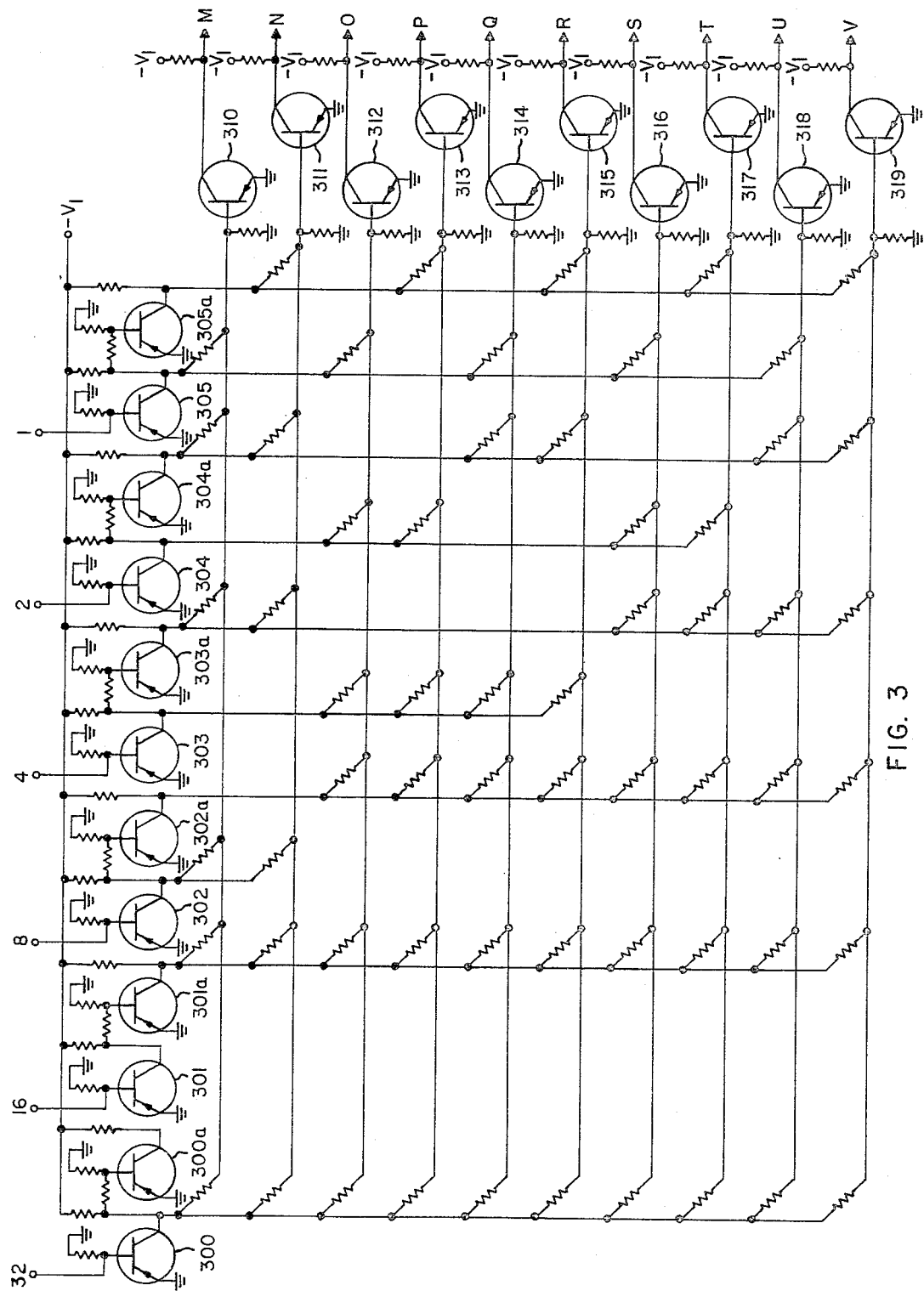
FIG. 3 is a detailed schematic diagram of a portion of the character matrix.

FIG. 3 is a detailed schematic diagram of a portion of that part of the character matrix 14 which converts the six-bit computer-supplied signal to an indication of the particular letter to be displayed. The input terminals designated 32, 16, 8, 4, 2 and 1 correspond to the output lines of computer 13 having the same designation. Input terminals 32, 16, 8, 4, 2 and 1 are respectively connected to the base electrodes of transistor-inverters 300, 301, 302, 303, 304 and 305. The collector electrode of each of these inverters is respectively connected to the base electrode of transistor-inverters 300a, 301a, 302a, 303a, 304a and 305a. Inverters 300–305 and 300a–305a operate to develop two signals at different levels "0" and "1" for each input bit of the computer-supplied signal, "0" being used to refer to zero potential and "1" being used to refer to some negative potential.

Each transistor 310–319 in the character matrix 14 operates to produce a binary "0" output signal only when all signals applied to its base electrode are in a binary "1" state—if any one signal applied to its base electrode is in its binary "0" state, that transistor will produce a binary "1" output signal. Thus, considering transistor 310, for example, that transistor produces a binary "0" output signal only if the computer-supplied signal is of the form 010110. (In this context, it is to be understood that the left-hand bit of the computer-supplied signal represents the most significant bit [bit 32], while the right-hand bit represents the least significant bit [bit 1].) Conversely, transistor 310 produces a binary "1" output signal if the computer-supplied signal is of a form other than 010110.

The character matrix 14 has sixty-four output lines, ten of which have been represented in FIG. 3 as the letters M–V, inclusive, and which are connected to the collector electrodes of transistors 310–319. Each of the remaining fifty-four output lines are similarly connected to the collector electrode of one of fifty-four transistors (not shown), each of which is similar to any one of the transistors 310–319. Ten of these sixty-four output lines correspond to the numbers 0–9, twenty-six correspond to the letters A–Z, and twenty-eight correspond to twenty-eight symbols which may be displayed. (Up to twenty-eight different symbols may be displayed on the cathode-ray tube 10 in accordance with the present invention although it may be possible to develop more than twenty-eight different symbols from the segmented pattern of FIG. 1.) The resistor circuitry within unit 14 is so arranged that only one of those sixty-four transistors produces a binary "0" output signal at its collector electrode at any one time. The particular output line energized in this manner will depend upon and, furthermore, will correspond to, the particular character to be displayed.

The character display apparatus of FIG. 2 further includes means for scanning the cathode-ray beam within cathode-ray tube 10 through the segmented pattern of FIG. 1. Such means includes a horizontal generator 15 and a vertical generator 16 for developing deflection signals to deflect the cathode-ray beam to scan the straight line diagonal segments ($D_1$–$D_4$) and the straight line corner segments ($a_1$, $b_1$–$a_8$, $b_8$) of the straight line figure-eight pattern. Such means also includes a second horizontal generator 17 and a second vertical generator 18 for developing deflection signals to deflect the cathode-ray beam to scan the curved line corner segments ($C_1$–$C_8$) of the curved line figure-eight pattern. Also included in this means are flip-flops 19–23 which form part of a scaler timing chain, the remainder of the chain including flip-flops 24–27, along with an astable multivibrator 29. Outputs at two different levels "0" and "1" are available at each stage of the timing chain.

The scanning means also includes means responsive to the character representative signals supplied by computer 13 for alternatively selecting portions of the above-developed deflection signals, as needed, to compose the desired characters. This latter means includes gate circuits 30 and 31 for selecting portions of the deflection signals corresponding to the straight line diagonal segments, gate circuits 32 and 33 for selecting portions of the deflection signals corresponding to the straight line corner segments, and gate circuits 34 and 35 for selecting portions of the deflection signals corresponding to the curved line corner segments. This means also includes OR circuits 36 and 37 for combining those portions of the above-developed deflection signals selected by gates 30–35 and for applying the combined portions to deflection coils 11 and 12 of cathode-ray tube 10 to deflect the cathode-ray beam therein. Also included in this means are flip-flop 23 of the scaler timing chain and curve select matrix 39 for controlling the selection of the appropriate deflection signals by gates 30–35. In particular, flip-flop 23 controls the selection of the deflection signals by gates 30 and 31 while flip-flop 23 and curve select matrix 39 control the selection of the deflection signals by gates 32–35. As will be more fully described hereinafter, curve select matrix 39 develops signals of opposite polarity which are used to either enable gates 32 and 33 and inhibit gates 34 and 35 or to inhibit gates 32 and 33 and enable gates 34 and 35. These opposite polarity signals are developed at output terminals 39a and 39b of curve select matrix 39.

Figure 4:
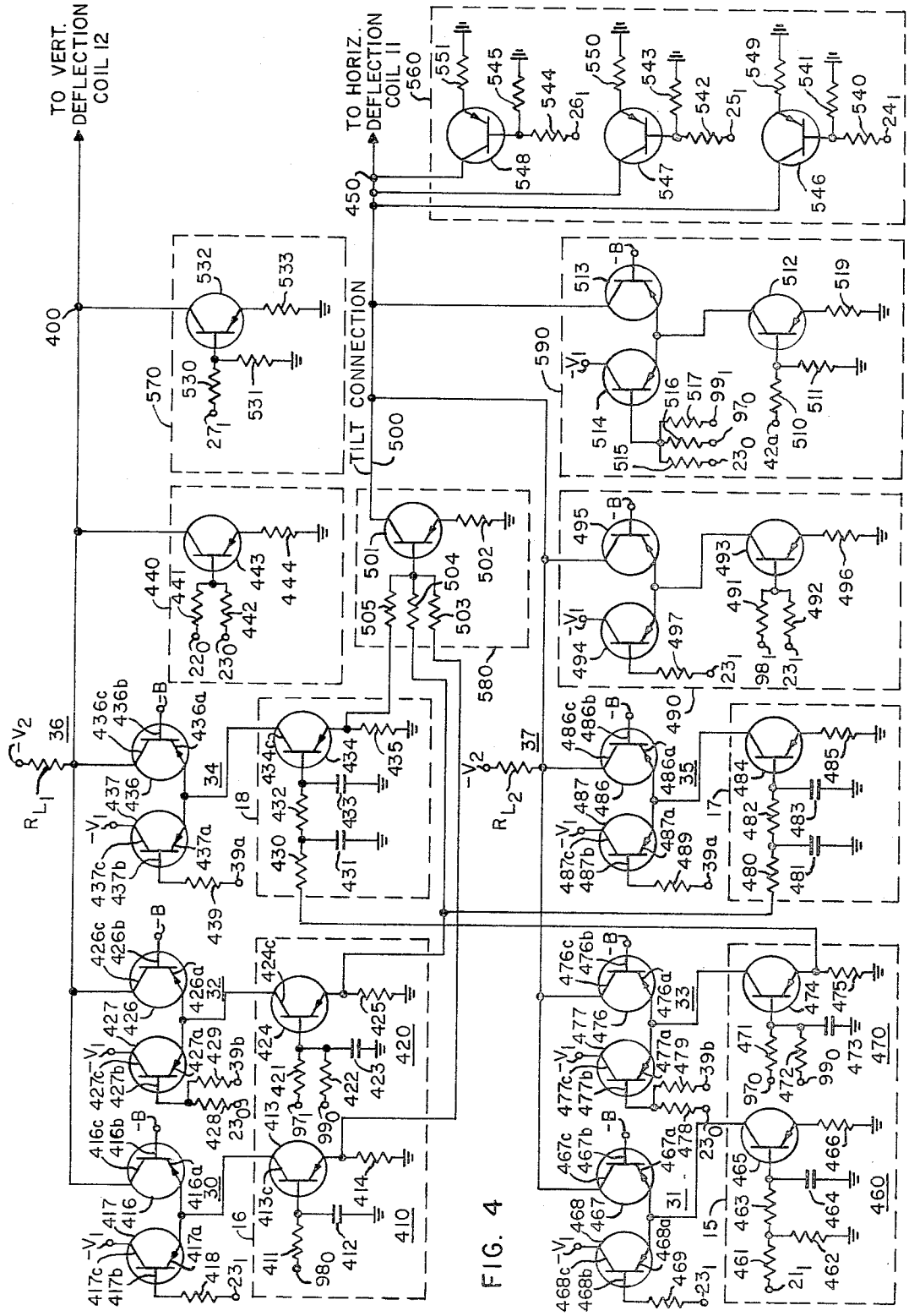
FIG. 4 is a detailed schematic diagram of the scanning circuitry.

There is shown in FIG. 4 a detailed schematic diagram of the scanning means described above. The upper circuit, having an output terminal 400 and designated "VERTICAL," corresponds to that portion of the scanning means which develops the composite vertical deflection signal. This circuit includes vertical generators 16 and 18, gate circuits 30, 32 and 34 and OR circuit 36. The lower circuit, having an output terminal 450 and designated "HORIZONTAL," corresponds to that portion of the scanning means which develops the composite horizontal deflection signal. This circuit includes horizontal generators 15 and 17, gate circuits 31, 33, and 35, and OR circuit 37.

Figure 5:
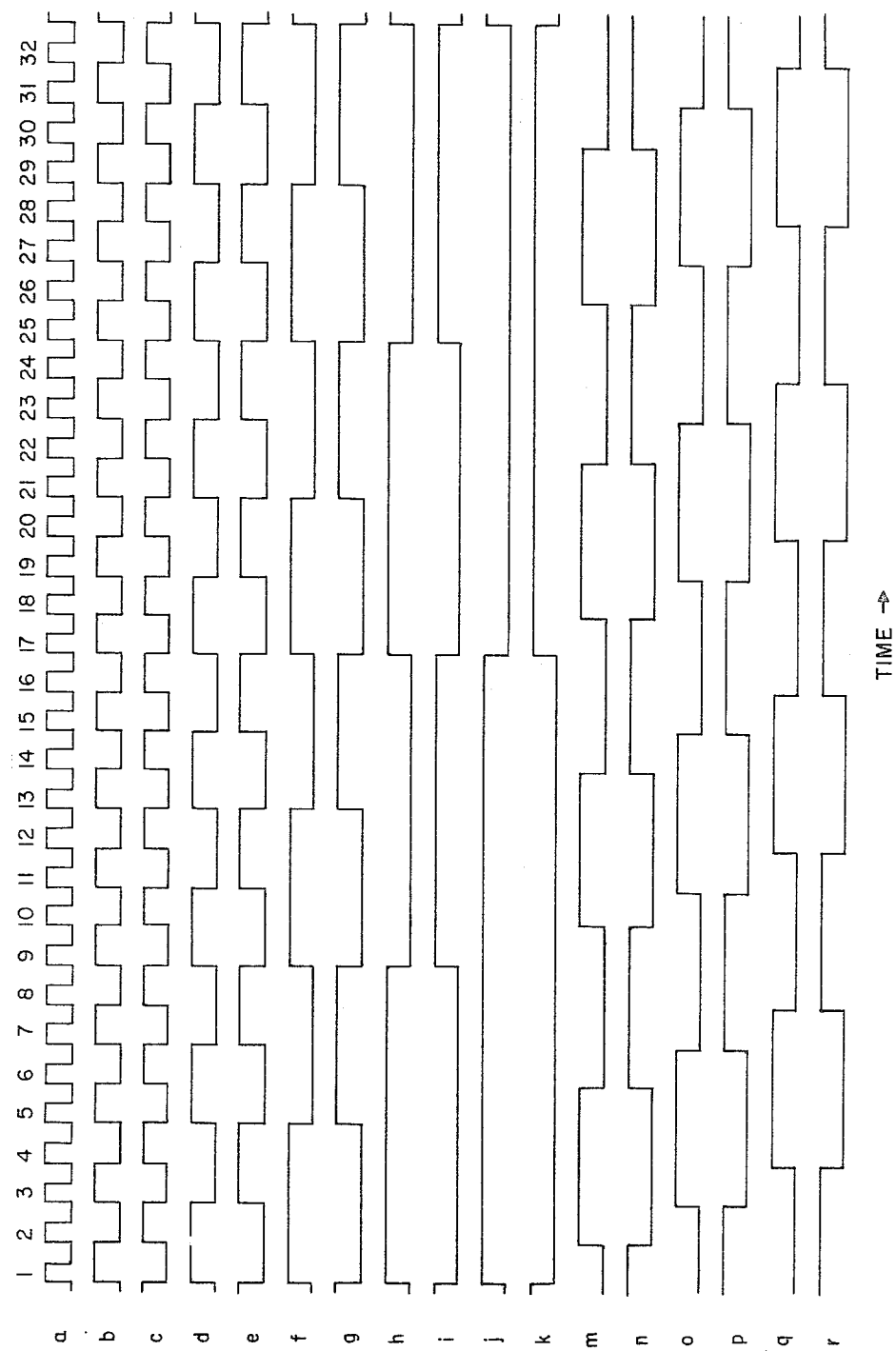
FIG. 5 shows waveforms of input signals to the scanning circuitry of FIG. 4.
Figure 6:
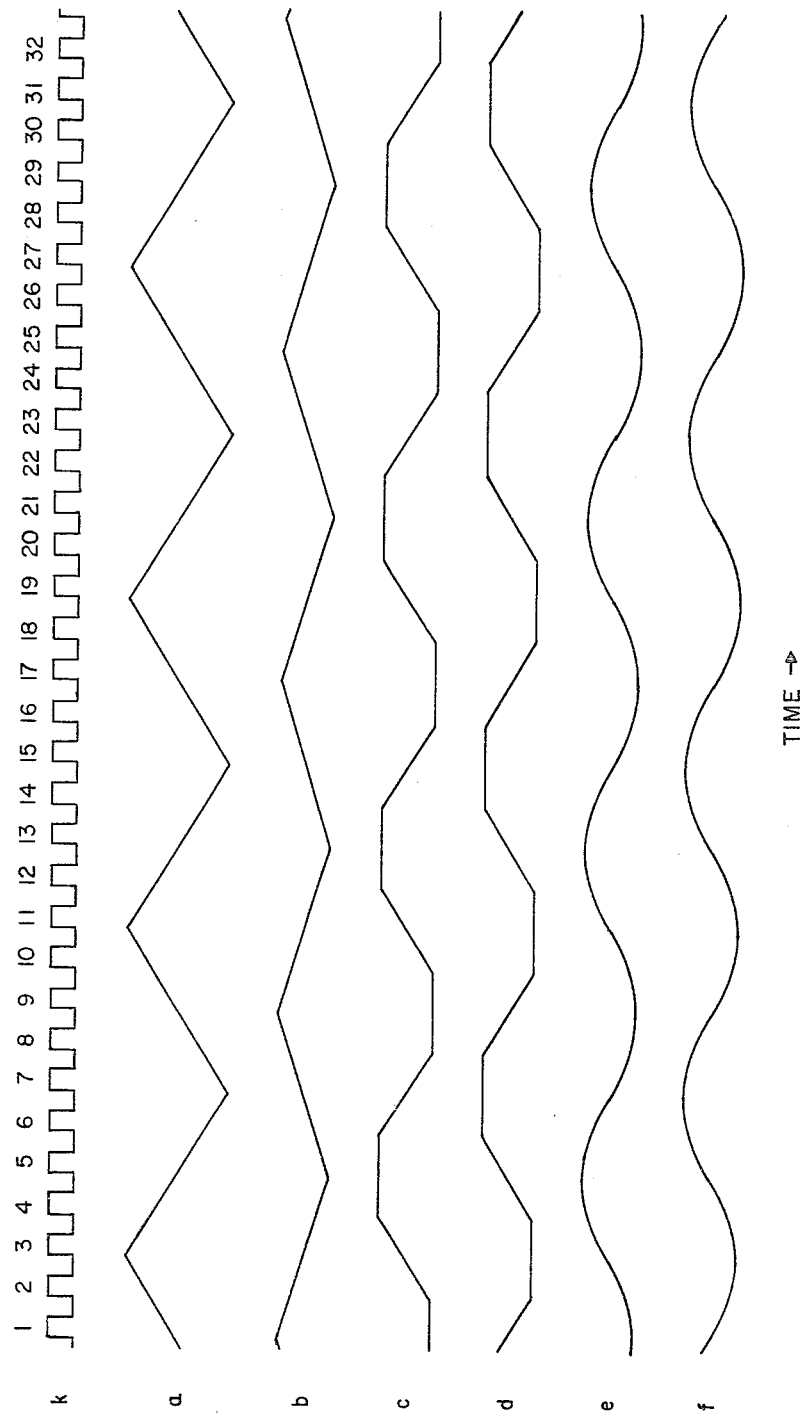
FIG. 6 shows waveforms of signals developed within the scanning circuitry of FIG. 4.

There are shown in FIGS. 5 and 6 a number of signal waveforms helpful in understanding the operation of the scanning means of FIG. 4. The waveforms of FIG. 5 represent various input signals to the scanning means while the waveforms of FIG. 6 represent various signals generated within the scanning means itself. Referring to FIG. 5, waveform a represents the pulse signal output of astable multivibrator 29, while waveforms b–k represent the pulse signal outputs of flip-flops 29–23 of the scaler timing chain 19–27. In particular: waveforms b and c represent the pulse signal outputs at terminals "1" and "0" of flip-flop 19; waveforms d and e represent the pulse signal outputs at terminals "1" and "0" of flip-flop 20; waveforms f and g represent the pulse signal outputs at terminals "1" and "0" of flip-flop 21; waveforms h and i represent the pulse signal outputs at terminals "1" and "0" of flip-flop 22; and waveforms j and k represent the pulse signal outputs at terminals "1" and "0" of flip-flop 23. Pulse signals waveforms b–k are developed as flip-flops 19–23 count and change state in the usual manner as clock pulses are supplied by astable multivibrator 29.

Signal waveforms m and n, of FIG. 5, represent the pulse signal outputs developed at the "0" and "1" output terminals of flip-flop 97, of FIG. 2, as flip-flop 97 is "set" by the signal developed at output terminal "1" of flip-flop 21 (waveform f), "pulsed" by the signal developed at output terminal "0" of flip-flop 19 (waveform c), and "reset" by the signal developed at output terminal "0" of flip-flop 21 (waveform g). Signal waveforms o and p represent the pulse signal outputs developed at the "0" and "1" output terminals of flip-flop 98 as flip-flop 98 is "set" by the signal developed at output terminal "0" of flip-flop 97 (waveform m), "pulsed" by the signal developed at output terminal "1" of flip-flop 19 (waveform b), and "reset" by the signal developed at output terminal "1" of flip-flop 97 (waveform n). Signal waveforms q and r represent the pulse signal outputs developed at the "0" and "1" output terminals of flip-flop 99 as flip-flop 99 is "set" by the signal developed at output terminal "0" of flip-flop 98 (waveform o), "pulsed" by the signal developed at output terminal "0" of flip-flop 19 (waveform c), and "reset" by the signal developed at output terminal "1" of flip-flop 98 (waveform p). Pulse signal waveforms m, o and q are each similar to pulse signal waveform f but differ from it and from one another as regards the clock pulse time delay between corresponding changes of potential. Pulse signal waveforms n, p and r are each similar to pulse signal waveform g but differ from it and from one another in the same manner.

Referring once again to the scanning means of FIG. 4, and particularly to the upper or vertical deflection circuit, the vertical straight line generator 16 includes a diagonal segment portion 410 and a corner segment portion 420. Considering first the diagonal segment portion 410, it includes an integrating circuit composed of resistor 411 and capacitor 412 connected to an amplifier stage including transistor 413 and emitter resistor 414. Resistor 411 is, as indicated, connected to output terminal "0" of flip-flop 98. The application to resistor 411 of the pulse signal developed at output terminal "0" of flip-flop 98 causes current to flow in the collector circuit of transistor 413 having the waveform shown as a in FIG. 6. Considering next the line segment portion 420, it includes an integrating circuit composed of resistors 421 and 422 and capacitor 423 connected to an amplifier stage including transistor 424 and emitter resistor 425. Resistor 421 is, as indicated, connected to output terminal "1" of flip-flop 97 while resistor 422 is connected to output terminal "0" of flip-flop 99. The values of resistors 421 and 422 are so chosen that there is a two-to-one amplitude ratio between the output signals developed by flip-flops 97 and 99 at the integrating circuit. The application to resistor 421 of the pulse signal developed at output terminal "1" of flip-flop 97, together with the application to resistor 422 of the pulse signal developed at output terminal "0" of flip-flop 99, causes current to flow in the collector circuit of transistor 424 having the waveform shown as c in FIG. 6.

The vertical curved line generator 18 also shown in the upper circuit of FIG. 4 includes a pair of series connected integrating circuits, composed of resistors 430 and 432 and capacitors 431 and 433, connected to an amplifier stage including transistor 434 and emitter resistor 435. Resistor 430 is, as indicated, connected to the corner segment portion 470 of the horizontal straight line generator 15, represented in the lower circuit of FIG. 4 as the units 471–475. More specifically, resistor 430 is connected to the emitter electrode of transistor 474. (The corner segment portion 470 of horizontal generator 15 operates in essentially the same manner as the corner segment portion 420 of vertical generator 16 with the exception that its integrator resistors 471 and 472 are connected to output terminal "0" of flip-flop 97 and to output terminal "0" of flip-flop 99, respectively, rather than to output terminal "1" of flip-flop 97 and to output terminal "0" of flip-flop 99 as was the case with the integrator resistors 421 and 422 of the corner segment portion 420. The current flowing in the collector circuit of transistor 474 has the waveform shown as d in FIG. 6.) The application to resistor 430 of the signal developed at the emitter electrode of transistor 474 (a signal having a voltage waveform similar to the inversion of the collector current waveform of transistor 474) causes current to flow in the collector circuit of transistor 434 having the waveform shown as e in FIG. 6.

Besides including the corner segment portion 470 of the horizontal straight line generator 15, the lower or horizontal deflection circuit of FIG. 4 also includes the diagonal segment portion 460 of generator 15 (units 461–466) and the horizontal curve line generator 17 (units 480–485). The diagonal segment portion 460 of horizontal generator 15 operates in essentially the same manner as the diagonal segment portion 410 of vertical generator 16—to cause a current to flow in the collector circuit of transistor 464 having the waveform shown as b in FIG. 6—with the exception that its integrator circuit resistor 463 is connected through a one-half divider network 461, 462 to the driving source which, in this case, is output terminal "1" of flip-flop 21. The horizontal curve line generator 17 operates in essentially the same manner as the vertical curve line generator 18—to cause a current to flow in the collector circuit of transistor 484 having the waveform shown as f in FIG. 6 when driven by the signal developed at the emitter electrode of transistor 424 of the corner segment portion 420 of vertical generator 16. The driving signal has a waveform similar to the inversion of the collector current waveform of transistor 424.

At this time it is to be noted that each character is displayed on the cathode-ray tube 10 in the time it takes astable multivibrator 29 to supply thirty-two clock pulses. This time may be divided into four intervals of eight clock pulses each. During the first interval (clock pulses 1–8), no segment of the FIG. 1 pattern is intensified, the interval being used for the settling of the cathode-ray beam within cathode-ray tube 10 and for eliminating the effects of propagation time through positioning flip-flops 24–27 of FIG. 2. During the second interval (clock pulses 9–16), the diagonal segments $D_1$–$D_4$ are selected from the FIG. 1 pattern and those diagonal segments needed to form the desired character are intensified. During the third interval (clock pulses 17–24), the line segments $a_1$–$b_4$, inclusive, are selected from the upper half of the FIG. 1 pattern, except when the desired character includes any of the curve segments $C_1$–$C_4$, in which case the curve segments are selected, and those line and/or curve segments needed to form the upper half of the desired character are intensified. During the fourth interval (clock pulses 25–32), the line segments $a_5$–$b_8$, inclusive, are selected from the lower half of the FIG. 1 pattern, except when the desired character includes any of the curve segments $C_5$–$C_8$, in which case the curve segments are selected, and those line and/or curve segments needed to form the lower half of the desired character are intensified. Flip-flops 19–23 are also included in the character display system of FIG. 2 to insure that the cathode-ray beam is scanning through the selected segment at the particular time that that segment is to be intensified. This synchronization is accomplished by controlling the development of the horizontal and vertical deflection signals.

There is set forth in Table 1 below, the sequence in which the cathode-ray beam scans through the composite pattern of FIG. 1. Table 1 also sets forth the direction of beam deflection as the pattern is scanned. Because of the synchronization of the beam deflection signals with the beam intensity signals, the sequence set forth also represents the sequence in which the individual segments of the pattern are intensified. It is to be remembered, however, that no segment is intensified during the first eight clock pulse interval.

TABLE 1

| Pulse Time Step in Sequence | Segment of Composite Pattern Scanned | Direction of Beam Deflection (Starting from the Center of the Pattern, X) |
|---|---|---|
| 1 | First half diagonal segment $D_1$. | Upwards and to the left. |
| 2 | Second half diagonal segment $D_1$. | Do. |
| ○ 3 | First half diagonal segment $D_2$. | Downwards and to the left. |
| 4 | Second half diagonal segment $D_2$. | Do. |
| 5 | First half diagonal segment $D_3$. | Downwards and to the right. |
| 6 | Second half diagonal segment $D_3$. | Do. |
| □ 7 | First half diagonal segment $D_4$. | Upwards and to the right. |
| 8 | Second half diagonal segment $D_4$. | Do. |
| 9 | First half diagonal segment $D_1$. | Upwards and to the left. |
| 10 | Second half diagonal segment $D_1$. | Do. |
| ○ 11 | First half diagonal segment $D_2$. | Downwards and to the left. |
| 12 | Second half diagonal segment $D_2$. | Do. |
| 13 | First half diagonal segment $D_3$. | Downwards and to the right. |
| 14 | Second half diagonal segment $D_3$. | Do. |
| □ 15 | First half diagonal segment $D_4$. | Upwards and to the right. |
| 16 | Second half diagonal segment $D_4$. | Do. |
| 17 | Line segment $a_1$ (or first half curve segment $C_1$). | To the left (and upwards). |
| 18 | Line segment $b_1$ (or second half curve segment $C_1$). | Upwards (and to the left). |
| 19 | Line segment $a_2$ (or first half curve segment $C_2$). | Upwards (and to the right). |
| 20 | Line segment $b_2$ (or second half curve segment $C_2$). | To the right (and upwards). |
| 21 | Line segment $a_3$ (or first half curve segment $C_3$). | To the right (and downwards). |
| 22 | Line segment $b_3$ (or second half curve segment $C_3$). | Downwards (and to the right). |
| 23 | Line segment $a_4$ (or first half curve segment $C_4$). | Downwards (and to the left). |
| 24 | Line segment $b_4$ (or second half curve segment $C_4$). | To the left (and downwards). |
| △ 25 | Line segment $a_5$ (or first half curve segment $C_5$). | To the left (and upwards). |
| 26 | Line segment $b_5$ (or second half curve segment $C_5$). | Upwards (and to the left). |
| 27 | Line segment $a_6$ (or first half curve segment $C_6$). | Upwards (and to the right). |
| 28 | Line segment $b_6$ (or second half curve segment $C_6$). | To the right (and upwards). |
| 29 | Line segment $a_7$ (or first half curve segment $C_7$). | To the right (and downwards). |
| 30 | Line segment $b_7$ (or second half curve segment $C_7$). | Downwards (and to the right). |
| 31 | Line segment $a_8$ (or first half curve segment $C_8$). | Downwards (and to the left). |
| 32 | Line segment $b_8$ (or second half curve segment $C_8$). | To the left (and downwards). |
| ○ 1 | First half diagonal segment $D_1$. | Upwards and to the left. |
| 2 | Second half diagonal segment $D_1$. | Do. |

Referring to Table 1: the circle notation between steps 2 and 3 and between steps 10 and 11 indicates that after step 2 has been completed and before step 3 has begun and after step 10 has been completed and before step 11 has begun, the cathode-ray beam is deflected in the horizontal direction from the upper left-hand corner of the composite pattern to the upper right-hand corner; the square notation between steps 6 and 7 and between steps 14 and 15 indicates that after step 6 has been completed and before step 7 has begun and after step 14 has been completed and before step 15 has begun, the cathode-ray beam is deflected in a horizontal direction from the lower right-hand corner of the pattern to the lower left-hand corner; the triangle notation between sequence steps 24 and 25 indicates that after step 24 has been completed and before step 25 has begun, the cathode-ray beam is deflected from the center of the pattern, X, to the center of the bottom line of the pattern, Y; and the ellipse notation between sequence steps 32 and 1 indicates that after step 32 has been completed and before step 1 has begun, the cathode-ray beam is deflected from the center of the bottom line, Y, to the center of the pattern, X. The parenthetical notations in sequence steps 17–32 indicate that the cathode-ray beam may be deflected to scan, without introducing any discontinuities, either the line segments of the pattern or the curve segments, depending on the particular character to be displayed. Each line segment is scanned in one pulse time, while each curve segment and each diagonal segment is scanned in two pulse times.

Referring once again to the vertical deflection circuit of FIG. 4, the emitter base junctions of transistors 416 and 417 represent the vertical diagonal segment gate 30, the emitter base junctions of transistors 426 and 427 represent the vertical line segment gate 32, and the emitter base junctions of transistors 436 and 437 represent the vertical curve segment gate 34. The collector base junctions of transistors 416, 426 and 436 and the common load resistor $R_{L1}$ represent the composite OR circuit 36. The emitter electrode 416a of transistor 416 and the emitter electrode 417a of transistor 417 are connected together and to the collector electrode 413c of transistor 413. The emitter electrode 426a of transistor 426 and the emitter electrode 427a of transistor 427 are connected together and to the collector electrode 424c of transistor 424. The emitter electrode 436a of transistor 436 and the emitter electrode 437a of transistor 437 are connected together and to the collector electrode 434c of transistor 434. The base electrodes 416b, 426b and 436b of transistors 416, 426 and 436, respectively, are each connected to sources of potential —B. The base electrode 417b of transistor 417 is, as indicated, connected through resistor 418 to output terminal "1" of flip-flop 23 of FIG. 2. The base electrode 427b of transistor 427 is, as indicated, connected through resistor 428 to output terminal "0" of flip-flop 23 and through resistor 429 to output terminal 39b of curve select matrix 39. The base electrode 437b of transistor 437 is, as indicated, connected through resistor 439 to output terminal 39a of curve select matrix 39. The potential source —B connected to the base electrodes 416b, 426b, and 436b has a value midway between the "0" and "1" levels of the signals developed by flip-flop 23 and by curve select matrix 39 and applied to the base electrodes 417b, 427b or 437b. The collector electrodes 416c, 426c and 436c of transistors 416, 426 and 436, respectively, are each connected to common load resistor $R_{L1}$ and to output terminal 400. The collector electrodes 417c, 427c and 437c of transistors 417, 427 and 437, respectively, are each connected to a source of potential —$V_1$.

By virtue of the above-described gating configuration, the current flowing through load resistor $R_{L1}$ will generally be composed of diagonal segment current, line segment current or curve segment current, or any combination of the three, depending on the particular character to be generated. The diagonal segment current flowing in the collector circuit of transistor 413 flows through transistor 416 and resistor $R_{L_1}$ to the source $-V_2$ during the first and second eight clock pulse intervals and flows through resistor 417 to the source $-V_1$ during the third and fourth eight clock pulse intervals. The line segment current flowing in the collector circuit of transistor 424 flows through transistor 427 to the source $-V_1$ during the first and second eight clock pulse intervals and through transistor 426 and resistor $R_{L_1}$ to the source $-V_2$ during the third and fourth eight clock pulse intervals if the cathode-ray beam is to scan the line segment portions of the composite pattern (evidenced by a "0" at output terminal 39b of curve select matrix 39). If the cathode-ray beam is to scan the curve segment portions of the composite pattern (evidenced by a "1" at output terminal 39b of curve select matrix 39), the line segment current flowing in the collector circuit of transistor 424 will also flow through transistor 427 to the source $-V_1$ during the third and fourth eight clock pulse intervals. The curve segment current flowing in the collector circuit of transistor 434 flows through transistor 437 to the source $-V_1$ during the first and second eight clock intervals and also during the third and fourth eight clock pulse intervals if the cathode-ray beam is to scan the line segment portions of the composite pattern (evidenced by a "1" at output terminal 39a of curve select matrix 39). If the cathode-ray beam is to scan the curve segment portions of the composite pattern (evidenced by a "0" at output terminal 39a of curve select matrix 39), the curve segment current flowing in the collector circuit of transistor 434 will flow through transistor 436 and resistor $R_{L_1}$ to the source $-V_2$ during the third and fourth eight clock pulse intervals. As will be described hereinafter, whether the cathode-ray beam is to scan line segment portions or curve segment portions of the composite pattern is determined by the curve select matrix 39 in response to the character representative indication produced by matrix 14. Curve select matrix 39 also determines which line and curve segments of the composite pattern are to be scanned by the cathode-ray beam. The combined signal currents flowing through resistor $R_{L_1}$ produce a signal voltage at output terminal 400 which is applied to deflection coil 12 of cathode-ray tube 10 to deflect the beam therein in the vertical direction.

The horizontal deflection circuit of FIG. 4 includes gate circuits 31, 33 and 35 and OR circuit 37, each of which is similar in construction and operation to its counterpart in the vertical deflection circuit. Thus, the signal current flowing through common load resistor $R_{L_2}$ is composed of the diagonal segment current flowing in the collector circuit of transistor 465 during the first and second eight clock pulse intervals and of selected portions of the line and curve segment currents flowing in the collector circuit of transistors 474 and 484 during the third and fourth eight clock pulse intervals. The combined signal currents flowing through resistor $R_{L_2}$ produce a signal voltage at output terminal 450 which is applied to the deflection coil 11 of cathode-ray tube 10 to deflect the beam therein in the horizontal direction.

There is further included in the vertical deflection circuit of FIG. 4, a stepping circuit 440 for deflecting the cathode-ray beam within cathode-ray tube 10 from the center of the composite pattern, X, to the center of the bottom line of the pattern, Y, between sequence steps 24 and 25 and for deflecting the cathode-ray beam from the center of the bottom line, Y, to the center of the pattern, X, between steps 32 and 1. The horizontal deflection circuit of FIG. 4 similarly includes a stepping circuit 490 for deflecting the cathode-ray beam from the upper left-hand corner of the composite pattern to the upper right-hand corner between steps 2 and 3 and steps 10 and 11 and for deflecting the cathode-ray beam from the lower right-hand corner to the lower left-hand corner between steps 6 and 7 and steps 14 and 15. Vertical stepping circuit 440 includes resistors 441 and 442, transistor 443, and emitter resistor 444. As indicated, resistor 441 is connected to output terminal "0" of flip-flop 22 of FIG. 2 while resistor 442 is connected to output terminal "0" of flip-flop 23. The application to resistor 441 of the pulse signal developed at output terminal "0" of flip-flop 22, together with the application to resistor 442 of the pulse signal developed at output terminal "0" of flip-flop 23, causes current to flow in the collector circuit of transistor 443, through resistor $R_{L_1}$ to the source $-V_2$ during the first, second and third eight clock pulse intervals. The absence of this current during the fourth eight clock pulse interval decreases the total vertical deflection voltage to the extent that the cathode-ray beam is stepped vertically downward at pulse time 25. At pulse time 1, the current flows once again, thereby stepping the cathode-ray beam vertically upward.

Horizontal stepping circuit 490 includes resistors 491, 492, 496 and 497 and transistors 493, 494 and 495. As indicated, resistor 491 is connected to output terminal "1" of flip-flop 98 of FIG. 2, resistor 492 is connected to output terminal "1" of flip-flop 23, as is resistor 497, while the base electrode of transistor 495 is connected to a source of potential $-B$. The application to resistor 491 of the pulse signal developed at output terminal "1" of flip-flop 98, together with the application to resistor 492 of the pulse signal developed at output terminal "1" of flip-flop 23, causes current to flow in the collector circuit of transistor 493 during the first and second eight clock pulse intervals. The application to resistor 497 of the pulse signal developed at output terminal "1" of flip-flop 23 causes this collector current to flow through resistor $R_{L_2}$ to the source $-V_2$ only during the third through the sixth pulse times of the first and second eight clock pulse intervals (pulse times 3–6 and 11–14). This current flow is such as to horizontally step the cathode-ray beam from the left-hand border of the pattern to the right-hand border and vice versa at the aforementioned times.

A lead line 500 designated TILT CONNECTION is connected between the vertical and horizontal deflection circuits of FIG. 4, via tilt signal generator 580, to tilt the pattern so that the characters displayed by the cathode-ray tube 10 are displayed in their natural way. The tilt signal is supplied through a transistor 501 having an emitter resistor 502 and resistors 503–505 to the vertical deflection transistors 413, 424 and 434. The remainder of the vertical and horizontal circuits of FIG. 4 will be described in detail hereinafter.

Referring once again to FIG. 2, the character display apparatus finally includes beam intensity control means, responsive to the character representative signal supplied by computer 13, for displaying on the cathode-ray tube 10 those segments of the FIG. 1 pattern needed to form the desired character. This means includes a line select matrix 38 for intensifying the needed diagonal segments and line segments of the straight line figure-eight pattern. This means also includes the curve select matrix 39 for intensifying the needed curve segments of the curved line figure-eight pattern. Also included in this means are a sequence gate matrix 40 for generating signals corresponding to segments of the composite pattern, a horizontal shift of vertical lines matrix 42 used in displaying the letters I, T, and Y and the number 1, and an intensifier OR circuit 41.

Figure 7:
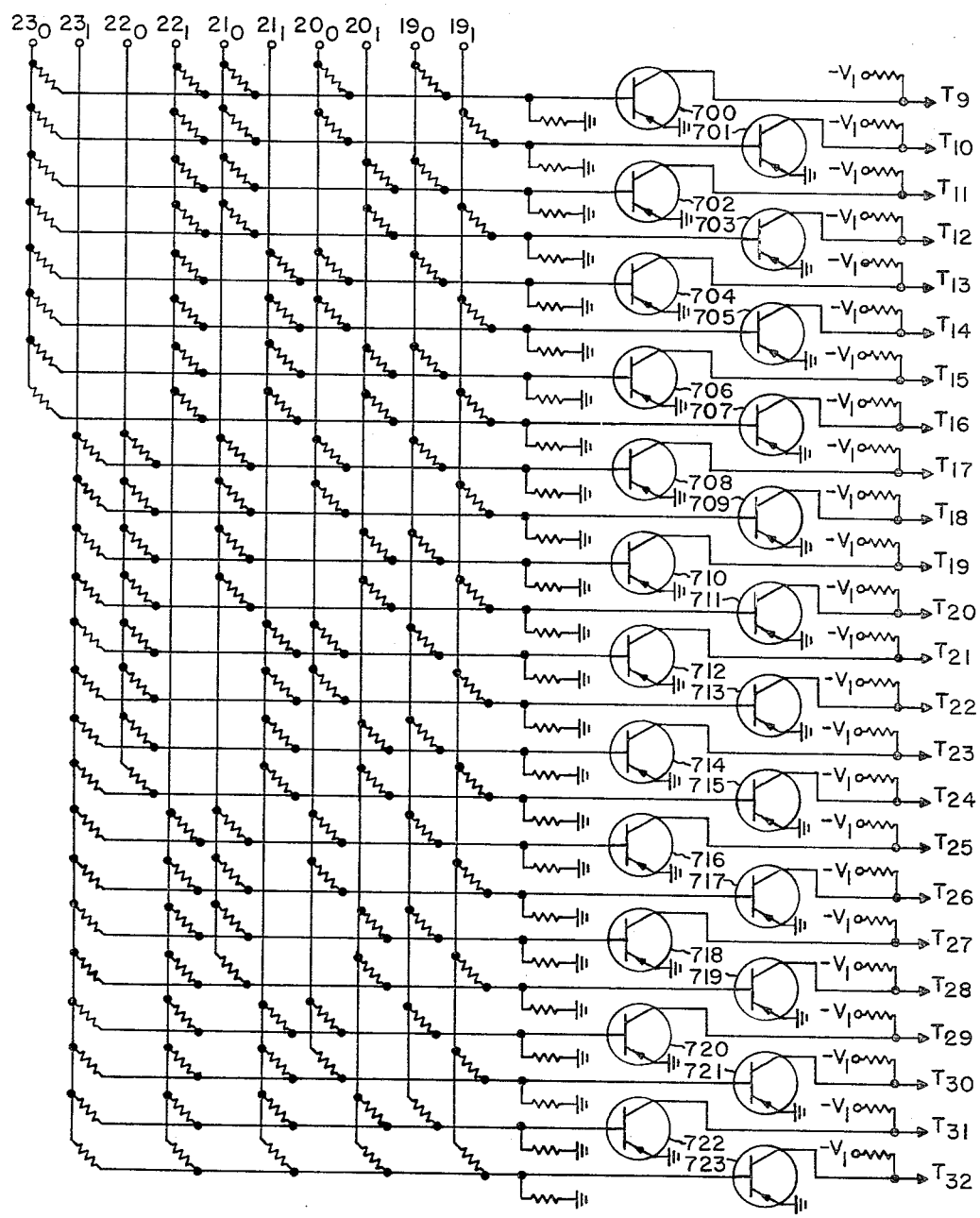
FIG. 7 is a detailed schematic diagram of the sequence gate matrix.

There is shown in FIG. 7 a detailed schematic diagram of the sequence gate matrix 40. The input terminals designated $19_0$–$23_1$, inclusive, correspond to the output terminals of flip-flops 19, 20, 21, 22 and 23; $19_0$ and $19_1$ being the output terminals of flip-flop 19; $20_0$ and $20_1$ being the output terminals of flip-flop 20, etc. Matrix 40, generates timing pulses used to control the order in which particular segments of the composite pattern are intensified. In particular, matrix 40 generates twenty-four sequentially timed pulses. The first eight pulses correspond in time to the eight clock pulses supplied by astable multivibrator 29 during the second eight clock pulse interval and are used to control the intensification of the diagonal segments $D_1$–$D_4$. The next eight pulses correspond in time to the eight clock pulses supplied by multivibrator 29 during the third eight clock pulse interval and are used to control the intensification of the line segments $a_1$–$b_4$ and of the curve segments $C_1$–$C_4$ of the upper half of the FIG. 1 pattern. The last eight pulses correspond in time to the eight clock pulses supplied by multivibrator 29 during the fourth eight clock pulse interval and are used to control the intensification of the line segments $a_5$–$b_8$ and of the curve segments $C_5$–$C_8$ of the lower half of the FIG. 1 pattern. These twenty-four timing pulses (hereinafter referred to as timing pulses $T_9$–$T_{32}$) are generated by transistors 700–723 of the matrix 40—timing pulse $T_9$ is generated by transistor 700, timing pulse $T_{10}$ is generated by transistor 701, etc. Each transistor in the group 700–723 operates to produce a binary "0" output signal only when all signals applied to its base electrode are in a binary "1" state. The resistor circuitry is so arranged that at any one time, only one transistor of the group 700–723 satisfies this condition. Each of the output signals generated by matrix 40 corresponds to a full segment of the FIG. 1 pattern, in the case of lines, or to a half segment of the FIG. 1 pattern, in the case of curves or diagonals. This follows since, as was previously mentioned, each line segment is scanned on the cathode-ray tube in a one clock pulse time while each curve segment and each diagonal segment is scanned on the tube in a two clock pulse time. Table 1 sets forth the particular segment or half segment of the FIG. 1 pattern corresponding to each of the twenty-four timing signals.

At this time, it is worthwhile to point out that those segments of the FIG. 1 pattern selected to form the desired character may be displayed in either of two ways. First, the cathode-ray tube 10 may be normally biased below cutoff. Then, as the pattern is scanned, the signals applied to the input electrodes of the tube render the tube conductive for the duration of those segments of the scan needed to form the desired character. Second, the cathode-ray tube 10 may be normally conductive. Then, as the pattern is scanned, the signals applied to the input electrodes of the tube render the tube nonconductive for the duration of those segments of the scan which are not needed to form the desired character. In the arrangement herein described, the first method of beam intensification is used.

Figure 8:
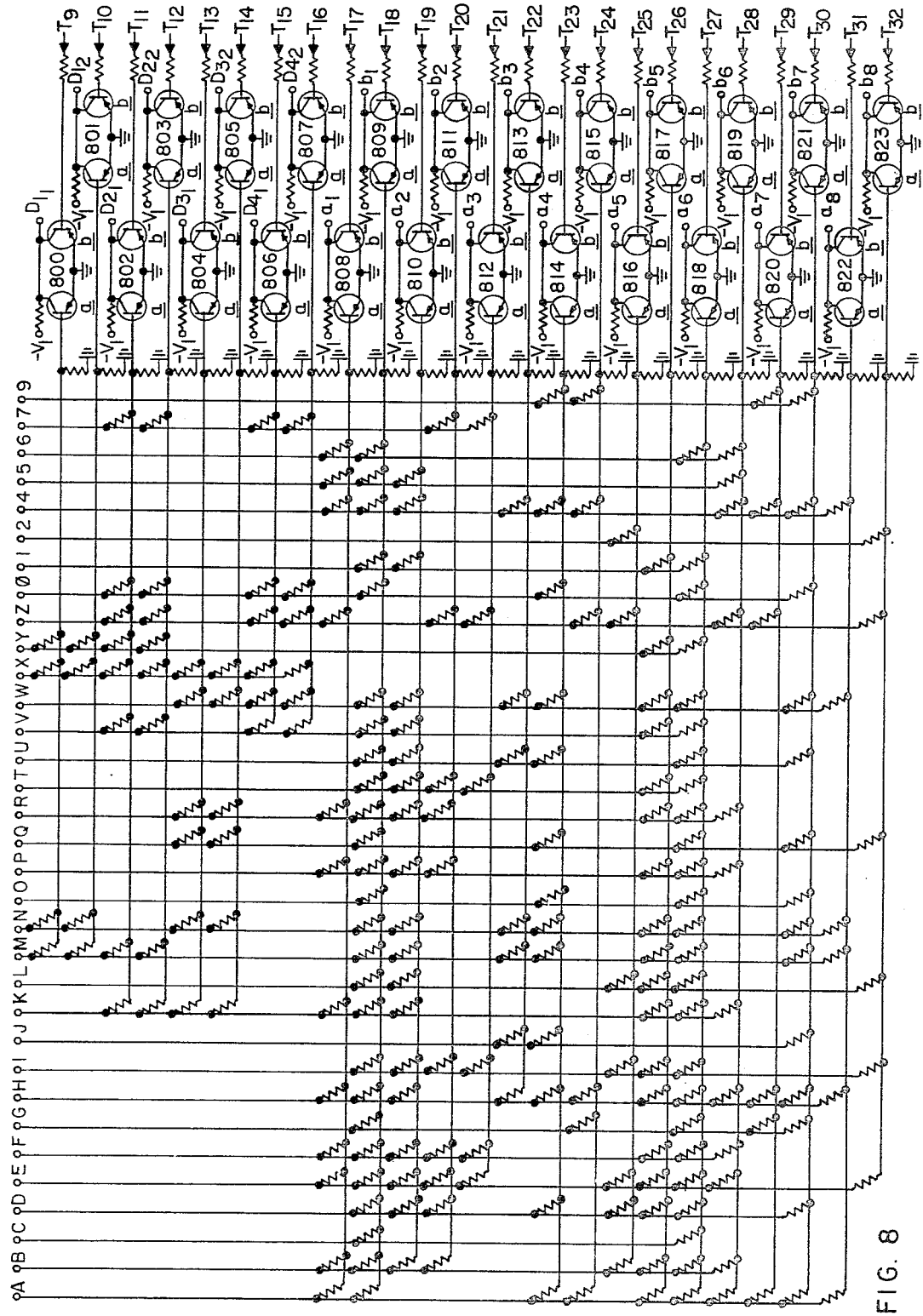
FIG. 8 is a detailed schematic diagram of the line select matrix.

There is shown in FIG. 8 a detailed schematic diagram of the line select matrix 38. Matrix 38 controls the intensification of those diagonal segments and line segments of the straight line figure-eight pattern of FIG. 1 needed to form the desired character. The input terminals designated A, B, C, D, E, etc., as shown, correspond to the output terminals of the character matrix 14 of FIG. 3 having the same designations. The input terminals designated $T_9$–$T_{32}$ correspond to the output terminals of the sequence gate matrix 40 of FIG. 7 having the same designations. The output terminals designated $D_{1_1}$–$D_{4_2}$, $a_1$–$a_8$, inclusive, and $b_1$–$b_8$, inclusive, correspond to the diagonal segments and line segments of the FIG. 1 pattern. Transistor pairs 800a and 800b—823a and 823b, each of which is associated with a particular diagonal or line segment, operate to produce binary "1" output signals only when a binary "0" timing pulse signal is applied to the base electrode of the right-hand transistor of each pair at the same time that one of the signals applied to the base electrode of the left-hand transistor is in its binary "0" state. These binary "1" output signals are then operated upon by the remainder of the display apparatus of FIG. 2 (as will be presently described) to render the cathode-ray tube 10 conductive during those portions of the cathode-ray beam scan corresponding to those diagonal segments and line segments of the FIG. 1 pattern which are necessary to form the desired character.

The resistor circuitry within matrix 38 is so arranged that when any one of the input terminals A, B, C, D, etc. is energized in its binary "0" sense, indicating that that particular character is to be displayed, binary "1" output signals will be developed by those transistor pairs coupled to that input terminal. The cathode-ray tube 10, therefore, will be rendered conductive during those portions of the scan corresponding to the segments associated with this group of transistor pairs (the diagonal and line segments needed to form the desired character). Binary "0" output signals will be developed by those transistor pairs which are not coupled to that input terminal. The cathode-ray tube 10, therefore, will be maintained nonconductive during those portions of the scan corresponding to the segments associated with this second group of transistor pairs (the diagonal and line segments not needed to form the desired character). Thus, the presence of a binary "1" signal on any one of the output lines of matrix 38 is an indication that the diagonal segment or line segment of the FIG. 1 pattern associated with that output line will be intensified. Conversely, the presence of a binary "0" signal is an indication that the diagonal segment or line segment will not be intensified. In this manner, the particular diagonal and line segments needed to form the desired character are intensified.

Figure 9:
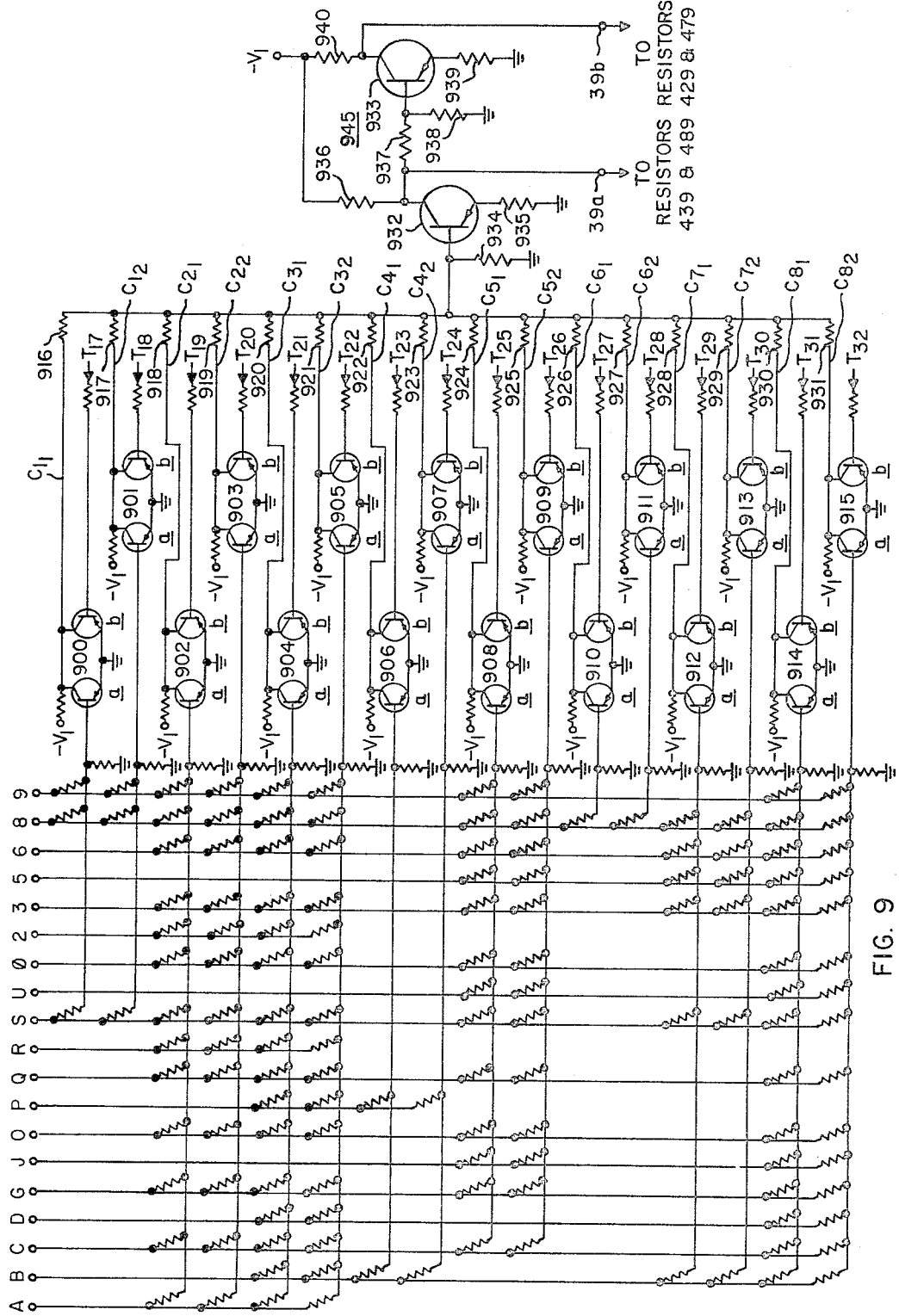
FIG. 9 is a detailed schematic diagram of the curve select matrix.

There is shown in FIG. 9 a detailed schematic diagram of the curve select matrix 39. Matrix 39 controls the intensification of those curve segments of the curved line figure-eight pattern of FIG. 1 needed to form the desired character. Curve select matrix 39 is similar in construction and operation to the line select matrix 38—thus, binary "1" signals are developed on lines $C_{1_1}$–$C_{8_2}$ of matrix 39 to render cathode-ray tube 10 conductive during those portions of the cathode-ray beam scan corresponding to those curve segments of the FIG. 1 pattern that are required to form the desired character. Similarly, binary "0" signals are developed on lines $C_{1_1}$–$C_{8_2}$ to maintain cathode-ray tube 10 nonconductive during those portions of the scan corresponding to those curve segments that are not required to form the desired character.

As was previously mentioned, matrix 39 also controls the signals applied to the horizontal and vertical deflection coils 11 and 12 of cathode-ray tube 10 so as to deflect the beam therein to scan either the line or curve segments of the FIG. 1 pattern. This is accomplished in the following manner. Each of the lines $C_{1_1}$–$C_{8_2}$ is connected through a plurality of resistors 916–931 to a two-stage inverter amplifier 945, composed of transistors 932 and 933 and resistors 934–940. Inverter amplifier 945 operates to develop signals of opposite polarity at output terminals 39a and 39b whenever a signal is present on one of the lines $C_{1_1}$–$C_{8_2}$. In particular, inverter amplifier 945 operates to develop a binary "0" signal at output terminal 39a and a binary "1" signal at output terminal 39b only when a binary "1" signal is present on one of the lines $C_{1_1}$–$C_{8_2}$. The signal developed at output terminal 39a is, as indicated, coupled to resistors 439 and 489 of the scanning means of FIG. 4. This signal is such as to inhibit the vertical and horizontal curve deflection gates 34 and 35 when a curve segment is not to be selected from the FIG. 1 pattern and to enable gates 34 and 35 when a curve segment is to be selected. The signal developed at output terminal 39b, on the other hand, is, as indicated, coupled to resistors 429 and 479 of the scanning means. This signal is such as to enable the vertical and horizontal line deflection gates 32 and 33 when a line segment is to be selected from the FIG. 1 pattern and to inhibit gates 32 and 33 when a line segment is not to be selected. Thus, the deflection current flowing through load resistors $R_{L_1}$–$R_{L_2}$ of the scanning means of FIG. 4 during the third and fourth eight clock pulse intervals is generally composed of line deflection current for a first set of clock pulse times and of curved deflection current for a second set of clock pulse times. The specific clock pulse times are determined by the character representative signal supplied by matrix 14 to the input terminals of curve select matrix 39.

Figure 10:
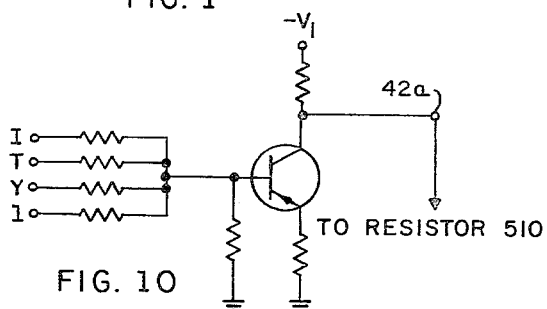
FIG. 10 is a detailed schematic diagram of the horizontal shift of vertical lines matrix.

There is shown in FIG. 10 a schematic diagram of the horizontal shift of vertical lines matrix 42 which is used in displaying the letters I, T and Y and the number 1 on the cathode-ray tube. Matrix 42 operates to develop a control signal which is used to horizontally deflect the cathode-ray beam within cathode-ray tube 10 from the left-hand border of the FIG. 1 pattern to a point midway between the left- and right-hand borders as the beam is scanning the left-hand vertical line segments of the pattern. The vertical line segments will then be properly displayed with respect to their diagonal and/or horizontal segments. Referring to FIG. 10, the input terminals designated I, T Y and 1 correspond to those output terminals of the character matrix 14 of FIG. 3 having the same designations. Matrix 42 operates to develop a binary "1" signal at its output terminal 42a whenever one of the signals applied to terminals I, T, Y or 1 is in its binary "0" state, indicating that that particular character is to be displayed. The output terminal 42a is, as indicated, connected to resistor 510 of the horizontal deflection circuit of FIG. 4. Referring to FIG. 4, it will be seen that resistor 510 comprises part of a one-half divider network through which the binary "1" control signal developed by matrix 42 is coupled to the base electrode of transistor 512. The application to resistor 510 of the signal developed by matrix 42 when the characters I, T, Y and 1 are to be displayed causes current to flow in the collector circuit of transistor 512. The application to resistor 515 of gate circuit 518 of the signal developed at output terminal "0" of flip-flop 23 (FIG. 5, waveform $k$), the application to resistor 516 of the signal developed at output terminal "0" of flip-flop 97 (FIG. 5, waveform $m$), and the application to resistor 517 of the signal developed at output terminal "1" of flip-flop 99 (FIG. 5, waveform $r$) allows this collector current to flow through resistor $R_{L_2}$ to the source $-V_2$ during the times that the cathode-ray beam scans the left-hand border of the FIG. 1 pattern. This added deflection current flowing through resistor $R_{L_2}$ causes the vertical line segments to be horizontally deflected to the right so that they are in their proper position for these four characters.

Figure 11:
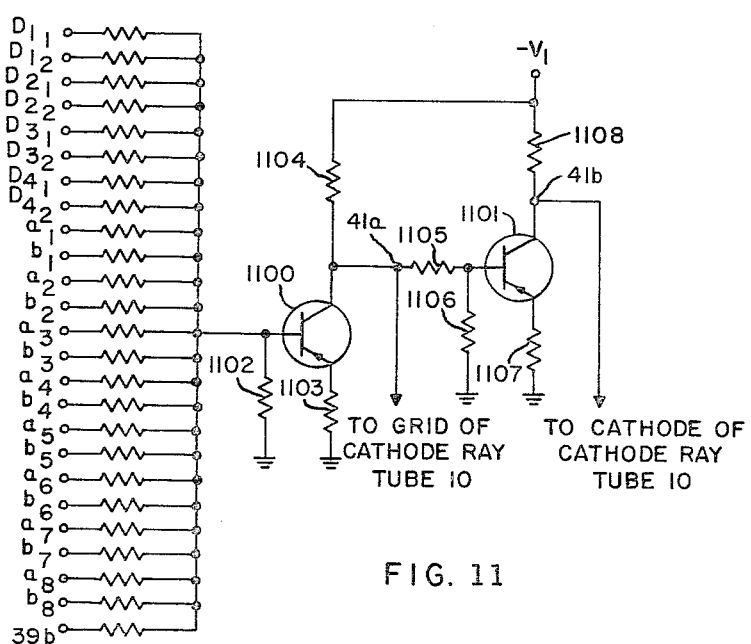
FIG. 11 is a detailed schematic diagram of the intensifier OR circuit.

There is shown in FIG. 11 a schematic diagram of the intensifier OR circuit 41. The intensifier OR circuit 41 consists of a two-stage transistor inverter composed of transistors 1100 and 1101 and resistors 1102–1108. The input terminals designated $D_{1_1}$–$D_{4_2}$, $a_1$–$a_8$ and $b_1$–$b_8$ correspond to the output terminals of line select matrix 38 having the same designations while the input terminal designated $C_{39b}$ corresponds to output terminal 39b of curve select matrix 39. OR circuit 41 operates to develop signals of opposite polarity at output terminals 41a and 41b in response to the application of an input signal to any of its input terminals. In particular, OR circuit 41 operates to develop a binary "0" signal at output terminal 41a and a binary "1" signal at output terminal 41b whenever one of the signals applied to its input terminals is in its binary "1" state. The binary "0" signal developed at output terminal 41a is of such polarity that if applied to the grid of the cathode-ray tube 10, it drives the tube above cutoff, thereby rendering it conductive. The binary "1" signal developed at output terminal 41b is of opposite polarity, so that if applied to the cathode of cathode-ray tube 10 it too drives the tube into its conducting region. One of these output signals is coupled to its respective electrode of the cathode-ray tube 10 to render it conductive during those portions of the cathode-ray beam scan corresponding to those segments of the FIG. 1 pattern which are required to form the desired character.

The operation of the character display apparatus of FIG. 2 may be more clearly understood by considering the following example. Assume that the six bit character representative signal supplied by computer 13 is of the form 011011 which, by definition, represents the letter R. Each bit of this six bit signal is coupled to its respective input terminal of the character matrix 14 of FIG. 3 which converts the six bit signal to an indication that the letter R is to be displayed. That is, the inverters 300–305, the inverters 300a–305a, and the resistor circuitry within matrix 14 are so arranged that, in response to this computer supplied signal, all signals applied to the base electrode of transistor 315 will be in their binary "1" state. As a result, transistor 315 produces a binary "0" signal on output line R. Binary "1" signals are produced on all other output lines.

Figure 12:
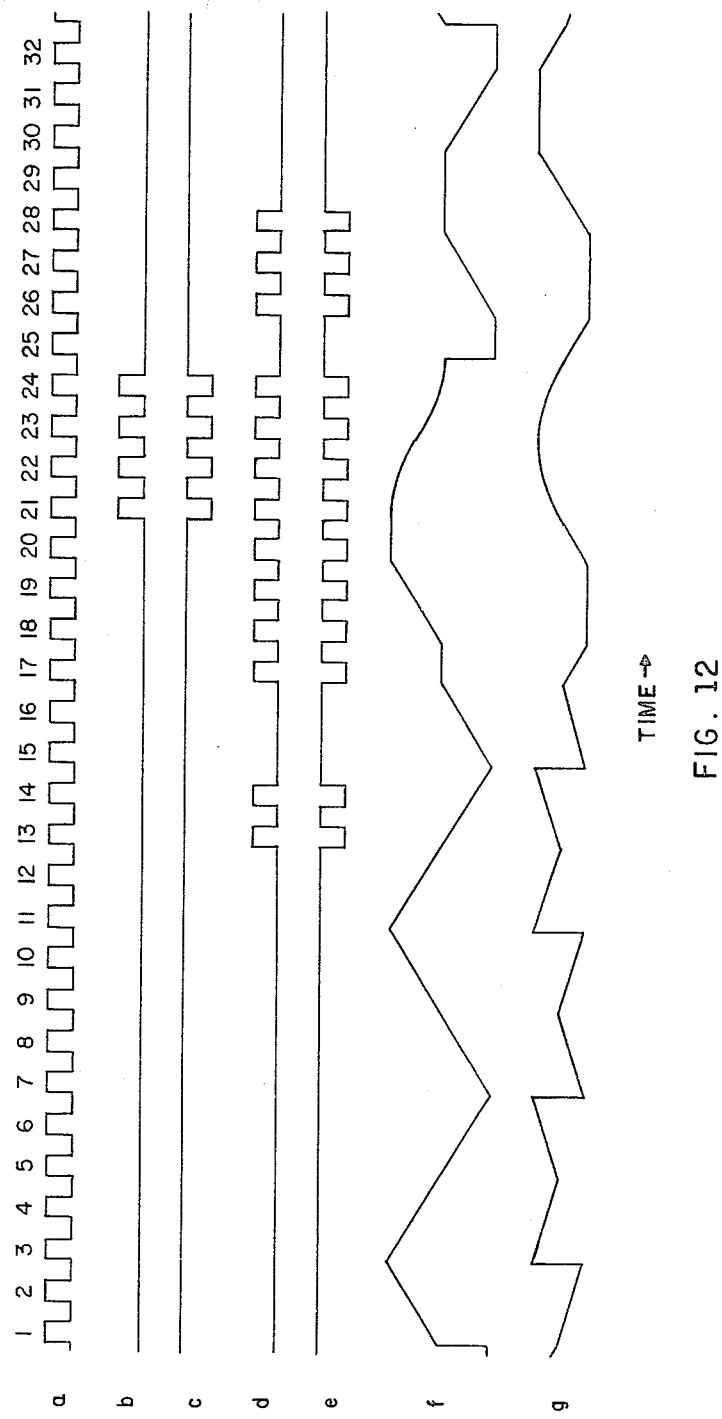
FIG. 12 shows waveforms of signals helpful in understanding the operation of the present invention.

Considering, first, the beam intensity control circuits with output line R energized thusly, binary "1" output signals will be produced on lines $D_{3_1}$, $D_{3_2}$, $a_1$, $b_1$, $a_2$, $b_2$, $b_5$, $a_6$ and $b_6$ of the line select matrix 38 of FIG. 8 while binary "0" output signals will be produced on lines $D_{1_1}$, $D_{1_2}$, $D_{2_1}$, $D_{2_2}$, $D_{4_1}$, $D_{4_2}$, $a_3$, $b_3$, $a_4$, $b_4$, $a_5$, $a_7$, $b_7$, $a_8$ and $b_8$. Similarly, with output line R so energized, binary "1" output signals will be produced on lines $C_{3_1}$, $C_{3_2}$, $C_{4_1}$ and $C_{4_2}$ of the curve select matrix 39 of FIG. 9, while binary "0" output signals will be produced on lines $C_{1_1}$, $C_{1_2}$, $C_{2_1}$, $C_{2_2}$, $C_{5_1}$, $C_{5_2}$, $C_{6_1}$, $C_{6_2}$, $C_{7_1}$, $C_{7_2}$, $C_{8_1}$, and $C_{8_2}$. The signals developed at output terminals 39a and 39b of curve select matrix 39 are shown as waveforms b and c in FIG. 12, wave form a representing the clock pulse output of astable multivibrator 29. The signals developed at output terminals 41a and 41b of intensifier OR circuit 41 are shown as waveforms d and e in FIG. 12.

Considering, next, the beam deflection circuits, the deflection current flowing through load resistor $R_{L_1}$ of the vertical deflection circuit of FIG. 4 for the case where the letter R is to be displayed consists of diagonal segment current during pulse times 1–16, line segment current during pulse times 17–20 and 25–32, and curve segment current during pulse times 21–24. The deflection current flowing through load resistor $R_{L_2}$ of the horizontal deflection circuit of FIG. 4 also consists of diagonal segment current during pulse times 1–16, line segment current during pulse times 17–20, and 25–32, and curve segment current during pulse times 21–24. The vertical and horizontal deflection current consists of line deflection currents during pulse times 17–20 and 25–32 and curve deflection currents during pulse times 21–24 by virtue of the signals developed at output terminals 39a and 39b of matrix 39 which are such that, when coupled to gates 34 and 35 and 32 and 33, respectively, line current gates 32 and 33 are enabled while curve current gates 34 and 35 are inhibited during pulse times 17–20 and 25–32 and line current gates 32 and 33 are inhibited while curve current gates 34 and 35 are enabled during pulse times 21–24. The composite vertical deflection current is shown as waveform $f$ in FIG. 12 while the composite horizontal deflection current is shown as waveform $g$. The vertical and horizontal deflection signals produced at output terminals 400 and 450 of FIG. 4 have waveforms identical to the composite vertical and horizontal deflection currents respectively and deflect the cathode-ray beam within cathode-ray tube 10 to scan those segments of the FIG. 1 pattern needed to compose the letter R. Additional segments of the FIG. 1 pattern will also be scanned by the cathode-ray beam but, as will now be described, only those segments of the pattern corresponding to the letter R will be intensified.

As was previously mentioned, the cathode-ray tube 10 is normally nonconductive, being rendered conductive by the output signals developed by intensifier OR circuit 41 during those portions of the scan corresponding to segments of the FIG. 1 pattern which are needed to form the desired character. The signal developed at output terminal 41a of intensifier OR circuit 41 is applied to the grid of the cathode-ray tube 10 to drive the tube into conduction during pulse times 13, 14, 17–24 and 26–28. Those segments of the FIG. 1 pattern corresponding to these pulse times are, as can be seen from Table 1, the segments $D_{3_1}$, $D_{3_2}$, $a_1$, $b_1$, $a_2$, $b_2$, $C_{3_1}$, $C_{3_2}$, $C_{4_1}$, $C_{4_2}$, $b_5$, $a_6$ and $b_6$. As is evident from the composite pattern of FIG. 1, it is just these segments that are necessary to form the letter R. Thus, by selecting these segments from the FIG. 1 pattern and by rejecting all the other segments, the letter R is displayed on the cathode-ray tube 10.

The foregoing description has set forth the manner in which a single character may be displayed by selecting appropriate segments of a single pattern and rejecting other segments of this pattern. The character display apparatus constructed in accordance with the present invention is also capable of simultaneously displaying a plurality of characters. This can be accomplished by developing each character from one of a plurality of patterns.

The horizontal deflection circuit of FIG. 4, in addition to developing the horizontal deflection signal for scanning a figure-eight pattern, additionally may step the pattern in a horizontal direction. That is, after a complete pattern has been scanned, another pattern is scanned at a different location. Thus, a row of figure-eight patterns may be scanned. After the row is complete, the horizontal deflection circuit returns the scan to the starting point. Similarly, the vertical deflection circuit of FIG. 4 may step the pattern in a vertical direction. Thus, after the horizontal deflection circuit returns the scan to the starting point, the vertical deflection circuit of FIG. 4 steps the scan vertically so that another row of figure-eight patterns may be scanned. Two rows of eight patterns each may be developed by the character display apparatus shown in FIG. 2. Output signals from terminals $24_1$, $25_1$, and $26_1$ of flip-flops 24, 25 and 26, respectively, are applied to the horizontal deflection circuit to step the pattern in the horizontal direction and the output signal from terminal $27_1$ of flip-flop 27, applied to the vertical deflection circuit, steps the pattern in the vertical direction after the row of horizontal patterns has been scanned. As shown in FIG. 4, terminal $27_1$ is connected to vertical output terminal 400 through resistors 530 and 531 and a transistor 532 having an emitter resistor 533. Terminals $24_1$, $25_1$ and $26_1$ are individually connected to horizontal output terminal 450 through resistors 540-545 and transistors 546-548, respectively, having emitter resistors 549-551.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. In a character generator for displaying characters on an image reproducing device by selecting segments of a composite pattern composed of straight and curved segments, signal generating apparatus comprising:

first means for supplying groups of signals, each group representative of a particular character to be displayed;

second means for generating a plurality of timing control signals;

third means coupled to said second means and responsive to said timing control signals, for generating deflection signals in a predetermined sequence, said deflection signals corresponding to straight and curved segments of said composite pattern;

and fourth means coupled to said first, second and third means and responsive to said character representative, timing control and deflection signals, for selecting a fixed number of deflection signals, said fixed number including a lesser number corresponding to the segments needed to form a particular character, and for supplying said selected deflection signals as output signals suitable for use by said image reproducing device, and for generating a fixed number of control signals, each corresponding to a given one of said selected deflection signals and indicative of whether or not the segment represented by the corresponding selected deflection signal is to be displayed, and for supplying said control signals as output signals suitable for causing said device to display a particular character.

2. In a character generator for displaying characters on a cathode-ray tube by selecting segments of a composite pattern composed of straight and curved segments, signal generating apparatus comprising:

first means for supplying groups of signals, each group representative of a particular character to be displayed;

second means for generating a plurality of timing control signals;

third means coupled to said second means and responsive to said timing control signals, for generating deflection signals in a predetermined sequence, said deflection signals corresponding to straight and curved segments of said composite pattern;

fourth means coupled to said first, second and third means, and responsive to said character representative, timing control and deflection signals, for selecting a fixed number of deflection signals, said fixed number including a lesser number corresponding to the segments needed to form the particular character, and for supplying said selected deflection signals as output signals suitable for scanning said pattern on the face of said tube;

and fifth means coupled to said first and second means and responsive to said character representative and timing control signals, for generating a fixed number of beam intensity control signals, each corresponding to a given one of said selected deflection signals and indicative of whether or not the segment represented by the corresponding selected deflection signal is to be displayed, and for supplying said control signals as output signals suitable for causing said tube to conduct to display the segments needed to form a particular character and be rendered non-conductive for all other segments.

3. Apparatus as described in claim 2, wherein said third means generates additional deflection signals suitable for shifting the pattern to different locations on the tube, and wherein said fourth means combines said additional deflection signals with said selected deflection signals and supplies said combined signals as said output signals.

4. Apparatus as described in claim 2, wherein the second means additionally comprises a source of clock pulses and a scalar timing chain, and wherein the third means generates deflection signals corresponding to different segments of a composite pattern comprising discrete horizontal and vertical straight line corner segments of a straight line figure-eight pattern and curved line corner segments of a curved line figure-eight pattern, each straight line corner segment having a curved line corner segment associated therewith.

5. Apparatus as described in claim 4, wherein the third means generates deflection signals for scanning the pattern so that each straight line corner segment and associated curved line corner segment are tangent at the corresponding ends, and contiguous to adjacent straight line corner segments and associated curved line corner segments within said straight line and curved line patterns for forming each particular character without discontinuity.

6. Apparatus as described in claim 4, wherein the fourth means alternatively selects deflection signals corresponding to each straight line corner segment or curved line corner segment associated therewith in the composite pattern.

7. Apparatus as described in claim 4, wherein the third means additionally generates deflection signals corresponding to straight line diagonal segments within said straight line figure eight pattern and wherein the lesser number of deflection signals additionally includes deflection signals corresponding to diagonal straight line segments needed to form a particular character.

8. Character display apparatus, comprising:
a cathode-ray tube for displaying selected segments of a composite pattern composed of straight and curved segments which form characters on the face of said tube;
first means for supplying groups of signals, each group representative of a particular character to be displayed;
second means for generating a plurality of timing control signals;
third means coupled to said second means and responsive to said timing control signals for generating deflection signals in a predetermined sequence, said deflection signals corresponding to straight and curved segments of said composite pattern;
and fourth means coupled to said first, second and third means and responsive to said character representative, timing control and deflection signals for selecting a fixed number of deflection signals, said fixed number including a lesser number corresponding to the segments needed to form a particular character and for coupling said selected signals to said tube, and for generating a fixed number of control signals each corresponding to a given one of said selected deflection signals and indicative of whether or not the segment represented by the corresponding selected deflection signal is to be displayed, and for coupling said control signals to said tube to cause said tube to conduct to display the segments needed to form a particular character and be rendered nonconductive for all other segments.

9. Apparatus as described in claim 8, wherein said third means generates additional deflection signals for shifting the pattern to different locations on the tube, and wherein said fourth means combines said additional deflection signals with said selected deflection signals and couples said combined signals to said tube.

10. Character display apparatus, comprising:
a cathode-ray tube for displaying selected segments of a composite pattern composed of straight and curved segments which form characters on the face of said tube;
first means for supplying groups of signals, each group representative of a particular character to be displayed;
second means for generating a plurality of timing control signals;
third means coupled to said second means and responsive to said timing control signals, for generating deflection signals in a predetermined sequence, said signals corresponding to straight and curved segments of said composite pattern;
fourth means coupled to said first, second and third means and responsive to said character representative, timing control and deflection signals for selecting a fixed number of deflection signals, said fixed number including a lesser number corresponding to the segments needed to form the particular character and for coupling said selected signals to said tube, for scanning said pattern on the face of said tube;
and fifth means, including resistor matrix circuitry coupled to said first and second means and responsive to said character representative and timing control signals, for generating a fixed number of beam intensity control signals, each corresponding to a given one of said selected deflection signals and indicative of whether or not the segment represented by the corresponding selected deflection signal is to be displayed, and for coupling said control signals to said tube, to cause said tube to conduct to display the segments needed to form a particular character and be rendered nonconductive for all other segments.

11. Apparatus as described in claim 10, wherein said third means generates additional deflection signals for shifting the pattern to different locations on the tube, and wherein said fourth means combines said additional deflection signals with said selected deflection signals and couples said combined signals to said tube.

12. Apparatus as described in claim 10, wherein the second means additionally comprises a source of clock pulses and a scalar timing chain, and wherein the third means generates deflection signals corresponding to different segments of a composite pattern comprising discrete horizontal and vertical straight line corner segments of a straight line figure-eight pattern and curved line corner segments of a curved line figure-eight pattern, each straight line corner segment having a curved line corner segment associated therewith.

13. Apparatus as described in claim 12, wherein the third means generates deflection signals for scanning the pattern so that each straight line corner segment and associated curved line corner segment are tangent at the corresponding ends, and contiguous to adjacent straight line corner segments and associated curved line corner segments within said straight line and curved line patterns for forming each particular character without discontinuity.

14. Apparatus as described in claim 12, wherein the fourth means alternatively selects deflection signals corresponding to each straight line corner segment or curved line corner segment associated therewith in the composite pattern.

15. Apparatus as described in claim 12, wherein the third means additionally generates deflection signals corresponding to straight line diagonal segments within said straight line figure-eight pattern and wherein the lesser number of deflection signals additionally includes deflection signals corresponding to diagonal straight line segments needed to form a particular character.

References Cited by the Examiner

UNITED STATES PATENTS

| | | | |
|---|---|---|---|
| 3,047,851 | 7/1962 | Palmiter | 340—324.1 |
| 3,067,413 | 12/1962 | Fischle et al. | 340—334 |
| 3,090,041 | 5/1963 | Dell | 340—324.1 |
| 3,104,387 | 9/1963 | Loshin | 340—324.1 |
| 3,205,488 | 9/1965 | Lumpkin | 340—324.1 |

NEIL C. READ, *Primary Examiner.*

A. J. KASPER, *Assistant Examiner.*